US012079912B2

(12) United States Patent
Mene et al.

(10) Patent No.: US 12,079,912 B2
(45) Date of Patent: Sep. 3, 2024

(54) ENHANCING IMAGES IN TEXT DOCUMENTS

(71) Applicant: International Business Machines Corporation, Armonk, NY (US)

(72) Inventors: Atul Mene, Morrisville, NC (US); Martin G. Keen, Cary, NC (US); Sarbajit K. Rakshit, Kolkata (IN); Tushar Agrawal, West Fargo, ND (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 18/054,162

(22) Filed: Nov. 10, 2022

(65) Prior Publication Data

US 2024/0161365 A1 May 16, 2024

(51) Int. Cl.
*G06T 1/00* (2006.01)
*G06F 40/20* (2020.01)
*G06T 3/40* (2006.01)
*G06T 5/00* (2006.01)
*G06T 11/60* (2006.01)

(52) U.S. Cl.
CPC .............. *G06T 11/60* (2013.01); *G06F 40/20* (2020.01); *G06T 3/40* (2013.01); *G06T 5/00* (2013.01)

(58) Field of Classification Search
CPC . G06T 11/60; G06T 3/40; G06T 5/001; G06T 5/00; G06F 40/20; G06F 40/30
See application file for complete search history.

(56) References Cited

U.S. PATENT DOCUMENTS

| 9,858,496 | B2* | 1/2018 | Sun .................... G06F 16/5838 |
| 10,628,931 | B1* | 4/2020 | Ramos ...................... G06T 5/50 |
| 10,699,171 | B2* | 6/2020 | Govrin ................... G06T 11/60 |
| 10,867,119 | B1* | 12/2020 | Karppanen ............ G06F 40/20 |
| 11,616,799 | B1* | 3/2023 | Canzanese, Jr. .... H04L 63/1425 726/23 |
| 2014/0250376 | A1* | 9/2014 | Jojic ....................... G06F 16/34 715/273 |

(Continued)

FOREIGN PATENT DOCUMENTS

| CN | 113360621 A | * | 9/2021 |
| CN | 113378580 A | * | 9/2021 |

(Continued)

OTHER PUBLICATIONS

CN-113360621-A English translation (Year: 2021).*

(Continued)

*Primary Examiner* — Laurie A Ries
(74) *Attorney, Agent, or Firm* — Stephen R. Yoder

(57) ABSTRACT

Images placed in documents are enhanced based on the context in which the image is used. Context is determined according to document-specific indicators such as nearby text, headings, titles, and tables of content. A generative adversarial network (GAN) modifies the image according to the context to selectively emphasize relevant components of the image, which may include erasing or deleting irrelevant components. Relevant general-purpose images may be retrieved for use in the document and may be selectively enhanced according to usage of the general-purpose image in a given document.

20 Claims, 4 Drawing Sheets

(56) References Cited

U.S. PATENT DOCUMENTS

| | | | | |
|---|---|---|---|---|
| 2015/0110413 | A1* | 4/2015 | Eronen | H04N 5/2621 |
| | | | | 382/254 |
| 2016/0189342 | A1* | 6/2016 | Gharavi-Alkhansari | ............... |
| | | | | G06T 7/50 |
| | | | | 345/660 |
| 2018/0039911 | A1* | 2/2018 | Bezzubtseva | G06N 20/00 |
| 2018/0046708 | A1* | 2/2018 | Stewart | G06V 10/762 |
| 2018/0204111 | A1* | 7/2018 | Zadeh | G06V 10/764 |
| 2020/0184210 | A1* | 6/2020 | Malabarba | G06V 10/426 |
| 2021/0081613 | A1* | 3/2021 | Begun | G06F 40/169 |
| 2021/0264568 | A1* | 8/2021 | Shi | G06T 3/4053 |
| 2022/0004713 | A1* | 1/2022 | Han | G06V 30/413 |
| 2022/0207355 | A1* | 6/2022 | Demyanov | G06N 3/084 |
| 2022/0237368 | A1* | 7/2022 | Tran | G06N 3/045 |
| 2022/0319219 | A1* | 10/2022 | Tsibulevskiy | G06T 3/60 |
| 2023/0042221 | A1* | 2/2023 | Xu | G06N 3/084 |
| 2023/0162503 | A1* | 5/2023 | Watanabe | H04N 7/18 |
| | | | | 348/143 |
| 2023/0306050 | A1* | 9/2023 | Gupta | G06F 40/40 |

FOREIGN PATENT DOCUMENTS

| | | | | |
|---|---|---|---|---|
| CN | 111091151 | B | 11/2021 | |
| CN | 111858954 | B * | 12/2022 | G06F 16/3344 |

OTHER PUBLICATIONS

"A Beginner's Guide to Generative Adversarial Networks (GANs) | Pathmind", Copyright © 2020, Pathmind Inc., 21 pages, <https://wiki.pathmind.com/generative-adversarial-network-gan>.

Atoum et al., "Color-wise attention network for low-light image enhancement", In Proceedings of the IEEE/CVF Conference on Computer Vision and Pattern Recognition Workshops, 2020, 10 pages.

Disclosed Anonymous, "Automatic Scaling of Text in Images During Expansion", An IP.com Prior Art Database Technical Disclosure, IP.com No. IPCOM000261936D, IP.com Electronic Publication Date: Apr. 17, 2020, 3 pages.

Disclosed Anonymous, Intelligent user interface method for displaying relevant objects:, An IP.com Prior Art Database Technical Disclosure, IP.com No. IPCOM000251012D, IP.com Electronic Publication Date: Sep. 27, 2017, 5 pages.

Lei, Nin, "Generative Adversarial Network technology: AI goes mainstream", Servers & Storage, Sep. 17, 2019, 4 pages, <https://www.ibm.com/blogs/systems/generative-adversarial-network-technology-ai-goes-mainstream/>.

Ni et al., "Towards Unsupervised Deep Image Enhancement with Generative Adversarial Network", IEEE Transactions on Image Processing, vol. 29, 2020, 12 pages.

* cited by examiner

ENHANCING IMAGES IN TEXT DOCUMENTS

BACKGROUND

The present invention relates generally to the field of document creation, and more particularly to modifying image use within a document.

Generative adversarial networks (GANs) are algorithmic architectures that use two neural networks, such as CNNs, as adversarial networks to generate new, synthetic instances of data that is similar to the real data of a training corpus such that the new data passes scrutiny as being real data. They are often used in image generation, video generation, and voice generation.

Natural language processing (NLP) is a field of technology where computing devices are programmed with capability to understand the contents of documents, including the contextual nuances of the language within them. The technology is often used to extract information and insights contained within the documents.

SUMMARY

In one aspect of the present invention, a method, a computer program product, and a system includes: determining a context for an image located within a document by: determining, by natural language processing (NLP), a meaning of a set of text within a pre-defined boundary of the location of the image in the document, the meaning indicating the context for using the image; identifying a set of features in the image; selecting a sub-set of features as being related to the context; and determining an enhancement action that emphasizes the sub-set of features over remaining features in the set of features.

DETAILED DESCRIPTION

Figure 1:
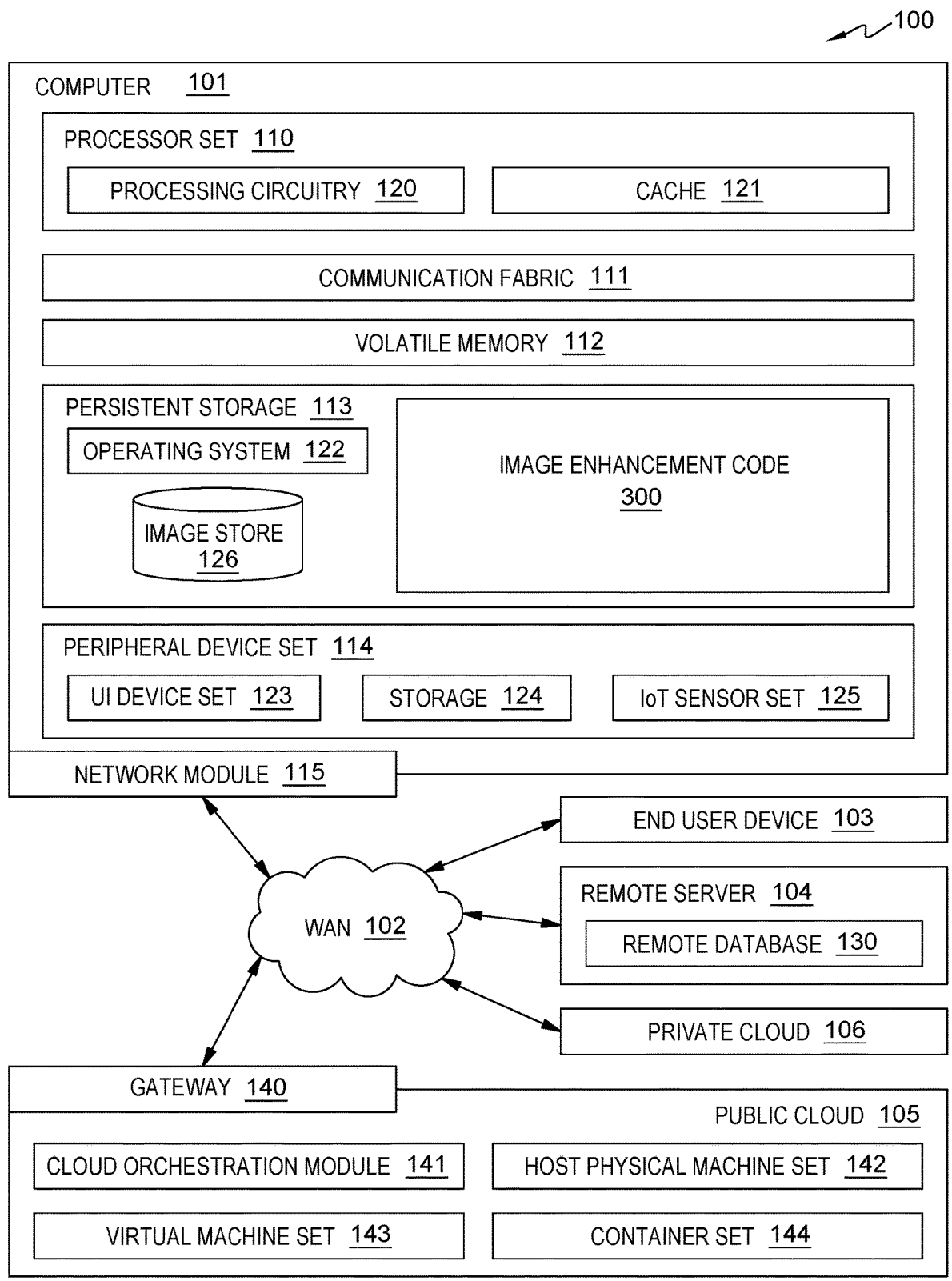
FIG. 1 is a schematic view of a first embodiment of a system according to the present invention.

Images placed in documents are enhanced based on the context in which the image is used. Context is determined according to document-specific indicators such as nearby text, headings, titles, and tables of content. A generative adversarial network (GAN) modifies the image according to the context to selectively emphasize relevant components of the image, which may include erasing or deleting irrelevant components. Relevant general-purpose images may be retrieved for use in the document and may be selectively enhanced according to usage of the general-purpose image in a given document. The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as image enhancement code 300. In addition to block 300, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 300, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 300 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 300 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Image enhancement code 300 operates to identify an image in a document and determine the context in which the image is used. The image enhancement code further selects components of the image that relate to the usage context and modifies the image to emphasize the selected components, whether objects or text in the image. The image enhancement code may further identify an image within a database for use in a document and subsequently perform modifications to the image based on a determined context in which the image is placed in a given document.

Some embodiments of the present invention recognize the following facts, potential problems and/or potential areas for improvement with respect to the current state of the art: (i) a GAN may be used for enhancing and/or deforming images based on the needs of users or for various other purposes; (ii) while creating any document, in many scenarios, images are added to a text document where the content of the image corresponds to the textual content. Oftentimes, the embedded images improve understanding of the textual content; and (iii) when scaling a given image up or down, the entire image is scaled in the same way within emphasizing one image object over another.

Within a given image, there can be different types of objects, different image objects, and different textual leveling for the image objects. Oftentimes, one image can have multiple image objects such that the same image is used in multiple places with respect to different contexts. Some embodiments of the present invention are directed to contextual scaling and/or enhancement of an embedded image in a selective manner such that a target image object of the embedded image is emphasized according to the context in which the image is used.

Some embodiments of the present invention are directed to improving the field of digital photography and digital content by advancing GAN technology in area where photographic tools may be provided as a cloud service. Further, some embodiments of the present invention may be implemented in digital content creation and search and distribution modeling.

Some embodiments of the present invention are directed to contextual image enhancement and rescaling. For example, based on the context of usage of any image, a GAN enabled system selectively enhances an appropriate one or more layers or objects of an embedded image, so that the modified image better represents the context of usage. According to some embodiments of the present invention, the enhancement is performed by selectively scaling up an object of interest where the object of interest is identified by analysis of nearby document text.

Some embodiments of the present invention are directed to a generative adversarial network-based method for providing higher resolution or completed output image based on a simpler and possibly incomplete input image. According to some embodiments of the present invention, a GAN enabled system segments the image into layers and objects based on the context. The system may further enhance or rescale, as appropriate, one or more layers or objects in an image based on contextual usage.

Figure 2:
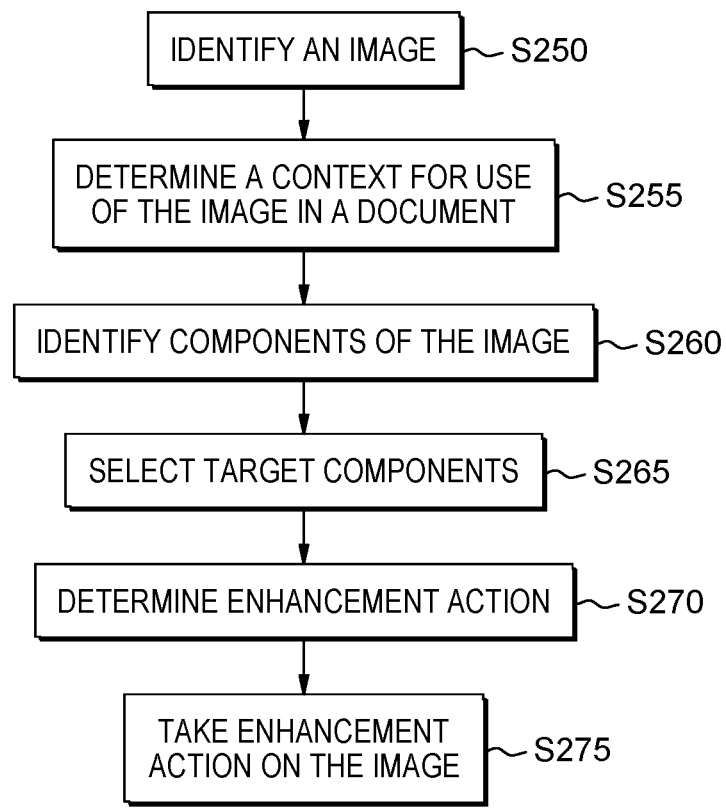
FIG. 2 is a flowchart showing a first method performed, at least in part, by the first embodiment system.
Figure 3:
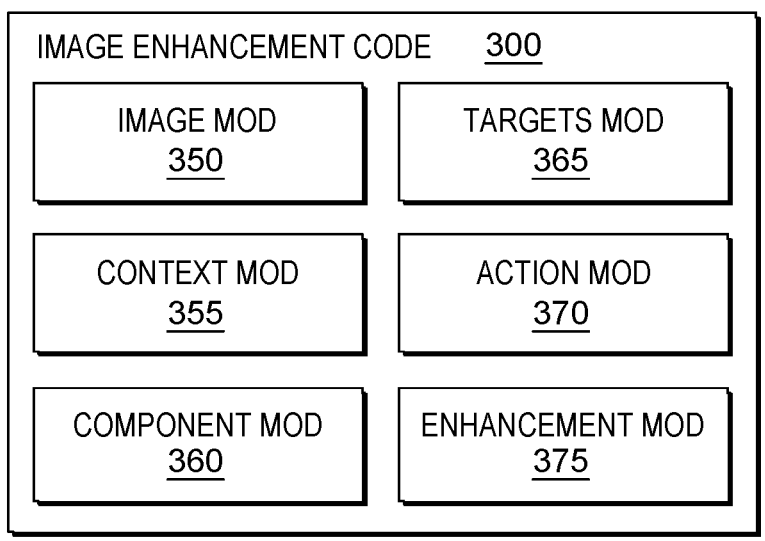
FIG. 3 is a schematic view of a machine logic (for example, software) portion of the first embodiment system.

In the discussion that follows with respect tot FIGS. 2 and 3, an image may contain components, which make up a single image. The components of an image may include individual objects, text, background, or foreground. The image may be a digital image having various layers on which the components reside such that a first layer may include one or more components of the image and a second layer may include the remaining components.

FIG. 2 shows flowchart 200 depicting a first method according to the present invention. FIG. 3 shows image enhancement code 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S250, where candidate image mod 350 identifies an image to be placed in a document. In this example, an image store contains categorized general-purpose images for use as illustrations in documents. Given a topic, the candidate image module retrieves a set of images from the general-purpose storage. Alternatively, images are retrieved from sources including the internet or a specified website, which may be available on a subscription basis and/or by use of login credentials. An example general-purpose image store is image store 126 (FIG. 1).

According to some embodiments of the present invention a single general-purpose image may represent a broad topic discussed in detail in a document. The image may be selected according to the broad topic that it represents and place at strategic locations throughout the document. Identification and/or selection of the image may be performed automatically by candidate image mod 350. Placement of the image may be performed by a user or other computing system generating the document for publication. Upon placement, processing may proceed to step S255 to determine a contextual basis for each placement location of the general-purpose image.

Processing proceeds to step S255, where context mod 355 determines a context for using a selected image in a document. In this example, when a selected image is placed into a document, the image context mod analyzes the document to determine a contextual basis for placing the selected image at a particular location within the document. Alternatively, a user request is received for enhancing a set of images in a document and image context mod identifies images in the document and determines contextual basis for placement of each of the images in the document.

Processing proceeds to step S260, where component mod 360 identifies components within the image. Identifying components may include determining what elements are presented in the image, identifying text in the image, and/or associating identified text with corresponding elements. In this example, an editable image is the selected image and is made up of layers on which the components are located. Accordingly, identifying components includes identifying layers on which the identified components are located. Alternatively, an image presents each of the components on a single layer and identifying the components in the image includes defining a location on the image where the components are shown.

According to some embodiments of the present invention, image analysis may be performed by automated machine vision integrated with artificial intelligence (AI) or machine learning algorithms or may be performed by a convolutional neural network (CNN) or deep neural network (DNN). As discussed herein, certain aspects of the present invention may be performed by a generative adversarial network (GAN) made up of CNNs and/or DNNs so that image analysis may be performed by one or more of the neural networks of the GAN.

Processing proceeds to step S265, where targets mod 365 selects target components related to the contextual basis for using the image. In this example, the selected image is placed at a specified location in the document and the contextual basis for placing the image is determined. Components of the selected image are identified by components mod 365 and targets mod 370 selects the components of the image that are related to the contextual basis. Alternatively, the targets mod operates responsive to identification of the various components visible in the image.

Processing proceeds to step S270, where action mod 370 determines an enhancement action to enhance the contextually relevant components of the image. Enhancement actions may include: (i) adjusting scale of a component, (ii) adjusting color(s) in a component, (iii) adjusting resolution of a component, and (iv) erasing an irrelevant component. Depending on the space available in the document, the action mod may edit the image by cropping out irrelevant components and/or reframing the image to center relevant components. Irrelevant text may be erased. Further, relevant text identified by targets mod 365 may be edited for grammar, font size, and/or color and enhancement actions of the image.

Processing ends at step S275, where enhancement mode 375 take the enhancement action on the image. In this example, when the enhancement action is determined, the enhancement mod automatically proceeds to modify the image according to the determined action and stores the modified document with the enhanced image. Alternatively, the enhancement action is presented to a user for approval to proceed. Alternatively, a modification of the image is presented to the user based on the determined enhancement action for user review. In some embodiments of the present invention, the user may view the modification while hovering over a location on the document where the image would be placed if the modification is approved by the user.

Further embodiments of the present invention are discussed in the paragraphs that follow and later with reference to FIGS. 4 and 5.

Some embodiments of the present invention are directed to embedding an image into a document while automatically determining the usage purpose of the image based on nearby textual information in the document. Further, particular objects in the image are enhanced based on the learned usage context. For example, an image of a heart may be automatically rescaled and enhanced from an image including other anatomical features, based on the context determined from nearby text.

Some embodiments of the present invention are directed to layer segmentation of object context. Based on the determined context for usage of an embedded image, the image is analyzed and parsed, or segmented, with appropriate layers and image objects. For a particular layer, the image quality is modified according to its relevance to the context in which the embedded image is used. Alternatively, for a particular layer, image object quality is modified according to its relevance to the context in which the embedded image is used. Alternatively, for a particular layer, image scale is modified according to its relevance to the context in which the embedded image is used. Alternatively, for a particular layer, image object scale is modified according to its relevance to the context in which the embedded image is used.

Some embodiments of the present invention are directed to GAN-generated layer rescaling. A determination is made as to the degree to which rescaling is performed and to which layer of the parsed image is to be rescaled. Accordingly, the GAN-enabled module takes the appropriate enhancement action on the embedded image based on the context in which the image is used in a particular instance within a given document.

Some embodiments of the present invention are directed to layer rescaling and contextual evaluation. During the embedded image enhancement process, available space in the document is analyzed and reliability of the content is determined. An appropriate rescaling level of a given layer is determined according to the evaluation. The GAN rescales or otherwise enhances the embedded image at the appropriate level as determined during the evaluation.

Some embodiments of the present invention are directed to adaptation of the target image according to a forecasted location in which the target image will be embedded into the document. During the embedding process in which an image is placed into a document, the location in which the image is embedded is identified so that the target textual content can be estimated for adapting the target image to the identified location with appropriate enhancements. The estimated textual content is based on analysis of the identified location where the target image is to be embedded. According to some embodiments of the present invention, identification of the location for embedding the target image is based on hovering over a location with the target image.

Some embodiments of the present invention are directed to a GAN enabled system for analyzing the context in which an image is used by considering usage purpose, textual content, image objects, and image qualities such as three-dimensional models, layered or overlapping objects, and underlying image structure (graphs, tables, bubble charts) and determines an enhancement scheme in which the context is emphasized. When an image is embedded into a document, the system enhances the image based on a determined context of usage and with respect to textual information in the document at the location where the image is embedded. The enhancement may include selective rescaling of an image layer or an image object within the embedded image. As noted herein, active enhancement of the image may occur during placement of the image into the document to promote visualization of the enhancement during the embedding process, such as by presenting an enhancement scheme while the image "hovers over" a location in the document.

According to some embodiments of the present invention, there is a pre-configuration phase where, for example, the user opts into the monitoring of documents during creation and when taking image-embedding actions within the documents. Users can consent to monitoring all documents under the control of a user, a subset of those documents, for example, in a given project, or an individual document controlled by the user. Monitoring of document creation may be turn on or off according to user instruction as well as opting in and out of using the system for image enhancement.

Some embodiments of the present invention are directed to analysis of an embedded image of a document to identify unreadable textual content in the embedded image and to identify textual information in the document in which the image is embedded. Proximity to the embedded image is one basis for which certain textual information is identified for analysis. When the user pastes an image into a selected document, the pasting process may be flagged as an activity for which further processing is to be performed.

An image analysis module analyzes the image to identify each object with the image. Object identification methods include: (i) a convolutional neural network (CNN) that is used to identify the objects; (ii) a scale-invariant feature transform (SIFT) descriptor based matching based on an algorithm that compares two images to find matches; (iii) a histogram of oriented gradients (HOG) may be used as a feature descriptor for object detection where the locations and orientations of objects are identified in an image; (iv) a shape context may be used for object detection and determining shape properties of identified objects; and (v) applying granularity to identify objects at different scales or granularities within an image.

As mentioned above, the CNN would derive objects within an image. The CNN may be pre-trained to identify certain objects within an image context or the CNN may be trained during the enhancement process to identify objects in any document. The SIFT approach uses keypoints to match images and can be used to find matches between objects in different images.

Some embodiments of the present invention are directed toward object analysis with textual context. For a given object of an image, text layers are identified while the GAN system generates text predictions for each text layer. Using an auto alignment approach to match objects with textual content, the correlation is maximized between the two text strings. An optimization approach may be used by mapping the visual space of an image to textual space of a corresponding paragraph in the document.

Some embodiments of the present invention are directed to identifying the usage purpose of an embedded image in a document. Some embodiments determine the frequency of use of certain images in one or more documents and/or within different sections of a single document. In that way, the portions of documents where certain images are embedded are analyzed according to the document structure to identify which portion of or object within the image is to be enhanced so that the clarity of the image content is aligned with the textual information of each portion of the document.

Some embodiments of the present invention are directed to GAN enabled image rescaling and enhancement. An appropriate level of rescaling of an image layer or object is identified so that, for example, readability can be improved. Various image objects are evaluated according to context of usage for enhancement determination on an object or layer level within the embedded image.

According to some embodiments of the present invention, the GAN enabled module selectively identifies appropriate portions of an embedded image object where the image is to be enhanced. The GAN enabled module performs rescaling on the appropriate layer of the image according to the analysis. The optimization of the embedded image is performed by measuring the correlation between different objects within the image and using appropriate optimization approaches.

Figure 4:
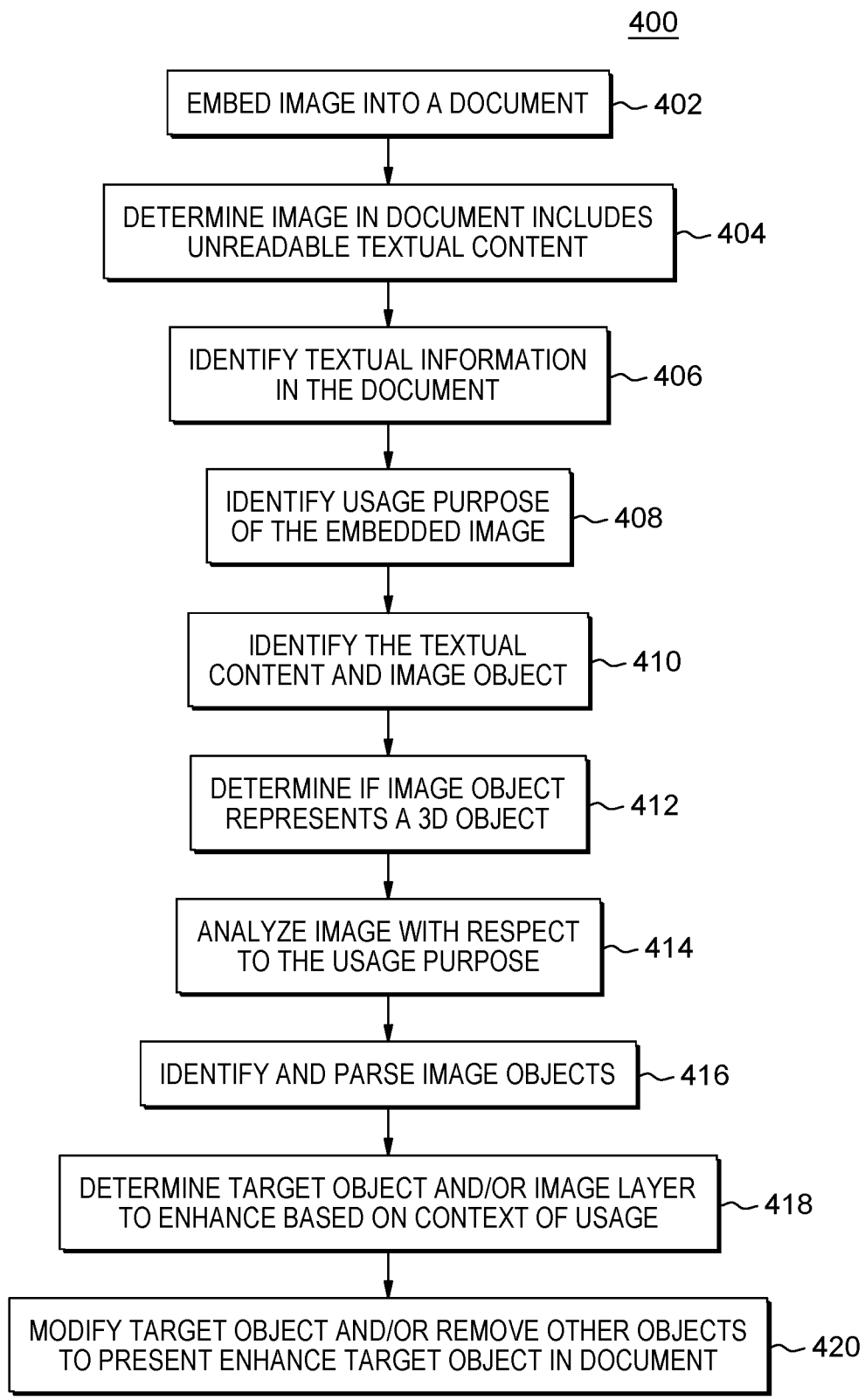
FIG. 4 is a flowchart showing a second method performed, at least in part, by the first embodiment system.

Referring now to FIG. 4, flowchart 400 is a first method performed by a GAN enabled system for analyzing the context in which an image is used by considering usage purpose, textual content, image objects, and image qualities and determining an enhancement scheme in which the context is emphasized.

Processing begins at step 402, where an image is embedded at a location within a document. In this example, the image is embedded in a specified location of a text document. Alternatively, the image is designated to be placed into the document and the location is dynamic, changing as the image is placed into the document. Alternatively, the image to be embedded hovers over the location within the document. Document locations may be based on, for example, heading or sub-heading text or chapter titles.

Processing proceeds to step 404, where the image is determined to include unreadable textual content. In this example the image includes an object and text, which is unreadable according to a threshold readability metric. The readability metric may be related to blurriness of the image, font size, or background content including the object or background colors.

Processing proceeds to step 406, where textual information in the document is identified. In this example, textual information is collected from locations proximate or adjacent the embedded image. Alternatively, the textual information in the document is identified and parsed according to structural elements of the document including headers, paragraphs, sections, pages, and/or columns. The image is located with respect to the identified structural elements and may be analyzed according to text within the bounds of a specified structural element.

Processing proceeds to step 408, where the usage purpose of the embedded image is identified. The usage purpose is derived from the textual elements of the image and corresponding text of the document.

Processing proceeds to step 410, where textual content and image objects are identified within the image.

Processing proceeds to step 412, where it is determined if an image object is a three-dimensional (3D) object.

Processing proceeds to step 414, where the embedded image is analyzed with respect to the determined usage purpose.

Processing proceeds to step 416, where image objects and other features are parsed or segmented. In this example, the embedded image is segmented into layers containing objects or features of the embedded image.

Processing proceeds to step 418, where a target object or image layer is identified for enhancement, the identification being based on context of usage of the embedded image. In this example, the contact of usage supports identification of a target object for enhancement such that the focus or topic presented in the text information of the document is emphasized by a specified enhancement process.

Processing ends at step 420, where the target object is modified, or other portions of the embedded image are removed, by the enhancement process. In this example, the embedded image is enhanced to make readable the unreadable text, which is determined to be related to the textual information of the document. Alternatively, the corresponding image object is repositioned or scaled such that the relevant textual content of the image is more readable.

Figure 5:
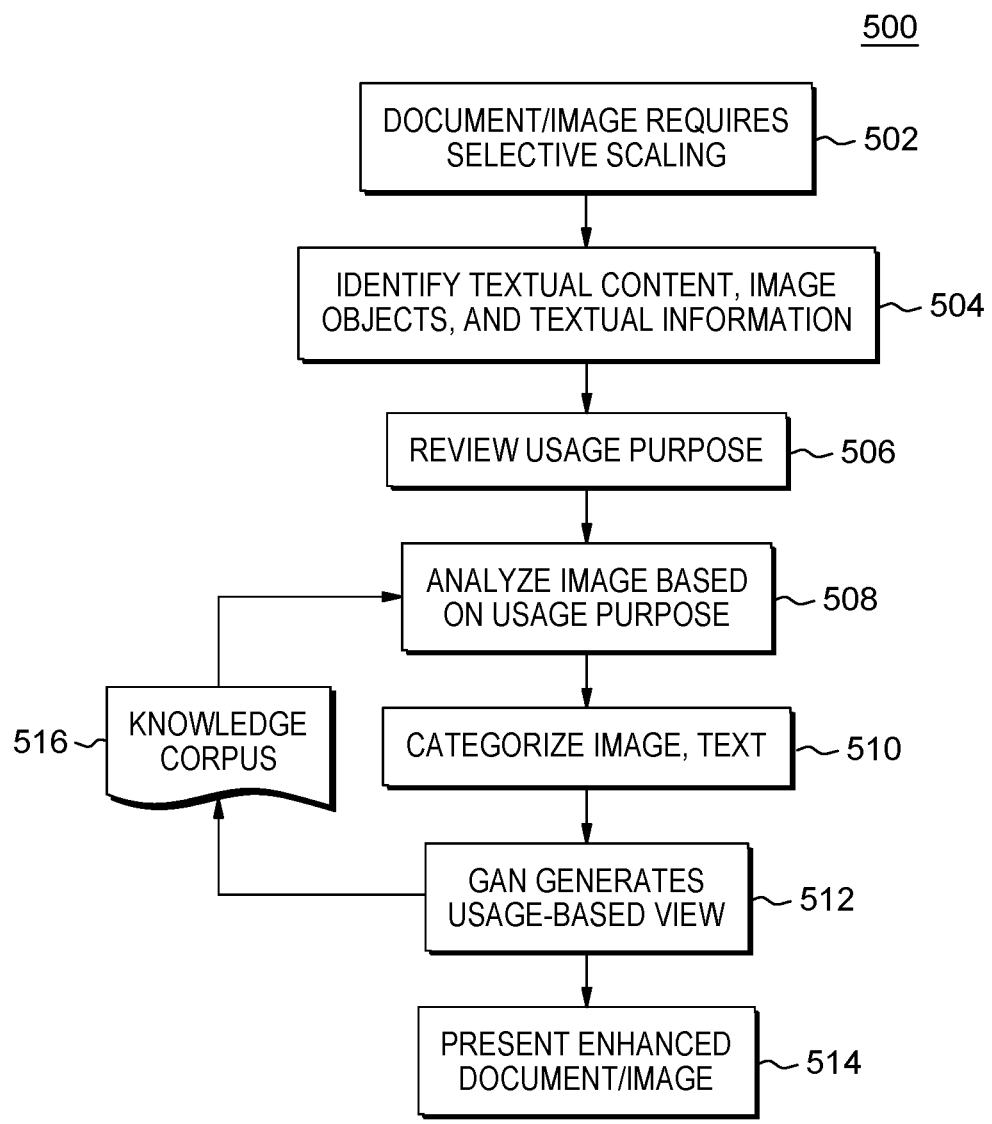
FIG. 5 is a flowchart showing a third method performed, at least in part, by the first embodiment system.

Referring now to FIG. 5, flowchart 500 is a second method performed by a generative adversarial network (GAN) enabled system for analyzing the context in which an image is used by considering usage purpose, textual content, image objects, and image qualities and determining an enhancement scheme in which the context is emphasized.

Processing begins at step 502, where it is determined that an image or document requires selective scaling. In this example, an embedded image is identified by a user for selective scaling. As discussed herein, a single embedded image may occur multiple times in a single document, so the need for selective scaling of the embedded image may apply to several locations within the document. Alternatively, a document is identified for selective scaling of the images embedded within the document.

Processing proceeds to step 504, where the image and document are analyzed for textual content, image objects, and textual information. Analysis may include determining readability of the textual content of the image, scope of information presented by the image object, and corresponding portions of document text providing relevant textual information for embedded images.

Processing proceeds to step 506, where the usage purpose of the embedded image is determined based on the analysis of step 504.

Processing proceeds to step 508, where an embedded image is analyzed in view of the determined usage purpose. As noted herein, each instance of a same embedded image may have an independent usage purpose drawn from the surrounding document text or the structural region of the document in which the image is embedded. Analysis of the embedded image identifies relevant text content and image objects presented by the image.

Processing proceeds to step 510, where components of the image are categorized according to relevant image components, such as text content and image objects. In some embodiments of the present invention, a category of text content or image object may be defined by a layer on which content of the same category are placed such that multiple layers would reflect multiple categories of text content or image objects.

Processing proceeds to step 512, where a GAN enabled system generates a usage-based view of the embedded image according to the determined usage purpose and relevant category, or layer, of image components.

As noted in flowchart 500, the generated usage-based view is stored in knowledge corpus 516 for further reference when determine a usage purpose of selected images.

Processing ends at step 514, where the enhanced document or image, including the usage-based view is presented to the user. The identified document or image is modified according to the analysis to include the usage-based view generated by the GAN enabled system. Enhancement may include rescaling an image object and/or erasing irrelevant portions of the embedded image.

Some embodiments of the present invention are directed to a three-dimensional (3D) matrix correlated to an identified usage in a target document or text portion. When a 3D image is inserted into a document, the image is parsed into different layers and depth to establish a 3D matrix of the 3D image. Based on an identified usage purpose, the appropriate 3D cell from the 3D image is enhanced for the identified purpose.

According to some embodiments of the present invention, image objects are identified based on the context in which the image is embedded into the document. Layers relevant to the identified objects are segmented out along with their quality and scale, which is to be aligned with the document context or textual content. It is determined if the image is three-dimensional (3D) image based on the image analysis. Essentially, the analysis facilitates a determination as to whether the image needs to be sliced as a 3D object would be.

Further, according to some embodiments of the present invention, there is a process in which object layer rescaling is performed based on the contextual evaluation of the embedded image. As mentioned above, the document where the image is pasted is evaluated to identify any textual content and potential need the 3D object adjustment. During the process of adjusting a 3D image, if any paragraph or text line is placed on or relatively near a surface of the 3D object, a correlation is determined between the 3D object and the identified text. If there is strong correlation of the text to the 3D object, the identified text is segmented out from the 3D object. Having isolated the correlated text by segmentation from the 3D object, a determination is made as to the scale or size of the isolated textual content with respect to the 3D object. The default metric for this process is line height (which is the average height of one line on a line of text). According to some embodiments of the present invention, the line height is calculated by dividing the total number of glyphs within a given paragraph with the total number of lines on that paragraph. If the line height is above or below a threshold value, the GAN system generates a textual content having a desired line height.

The proposed system determines whether enhancement should be performed on a given image or object within the image including various text objects within the image. Upon determining to enhance the image, the GAN enabled module generates an appropriate color map for the image or the given parsed objects from a 3D model. The enhancement is focused on enhancing a selected object based on textual content in which the image is embedded into a document. In some embodiments, the enhancement is performed to improve readability of text of the image and/or visibility of particular objects within the embedded image. The output is generated by combining each of the objects of the embedded image with textual content into a single image that provides an enhanced viewing experience for the user.

Some embodiments of the present invention are directed to enhancing a color map of given parsed object of a 3D model by fine tuning the map based on different contextual information, such as textual content and nearby objects within the image.

Some embodiments of the present invention are directed to using a GAN-enabled approach to image enhancement where a meta-model is trained to predict the likelihood that an image will contain a given class of object. The predicted likelihood of existence may be combined with a second network that predicts the actual class of objects within an image from the 3D model. The proposed system identifies appropriate objects from 3D model and the GAN module predicts the likelihood that the object is present in the image by using the meta-model.

According to some embodiments of the present invention, a GAN enabled module adapts the embedded image to the document content during enhancement. Adaptation includes adjusting the image size to match the given text content. If any enhancement is performed for a particular image object, the enhancement may be tuned by identifying the textual context of usage of the particular image object.

Some embodiments of the present invention identify whether there are different images embedded within a document or if only one image is embedded within the document.

Some embodiments of the present invention are directed to a process including: analyzing a document that is being accessed by a user's computer, wherein the analyzing the document comprises performing natural language processing (NLP) on text within the document; detecting the addition of a first image to the document; analyzing the first image, wherein the analyzing the image comprises identifying a set of objects within the image; identifying a first object within the set of objects that, based on the analyzing the document and the analyzing the first image, is of high relevance to the document; adjusting the first image, in response to the identifying the first object, to emphasize the first object; and adjusting, after the adjusting the first image, the dimensions of a set of text within the document.

Adjusting the first image may include resizing and rescaling the first object within the document. Adjusting the first image may include resizing and repositioning text that is within the first image and that pertains to the first object. Identifying the first object may include: identifying a set of text within the first document that is near the first image; identifying, through natural language processing (NLP), a meaning of the set of text; and determining that the first object within the set of objects is of higher relevance to the meaning than a second object within the set of objects. Analyzing the first image may include detecting that the first image is a 3D image and wherein the adjusting the first image further comprises selecting a layer of the 3D image that features the first object. Identifying the set of objects may be based on the NLP of the text within the document. Analyzing the document may further include performing image analysis on a second image within the document. Adjusting the first image may include adjusting a color map of the first image.

Some embodiments of the present invention may include one, or more, of the following features, characteristics and/or advantages: (i) contextual scaling of an image in a selective manner provides for a single image to be used in multiple places within a document under different contexts; and (ii) contextual enhancement of an image in a selective manner provides for a single image to be used in multiple places within a document under different contexts.

Some embodiments of the present invention are directed to analyzing the surrounding textual content of a document and auto adapting a candidate image with appropriate rescaling and quality improvements when the candidate image is embedded into the document. Some embodiments of the present invention are directed to selectively enhancing and/or rescaling one or more portions and/or layers of an image to align the modified image based on the usage in a given context. Further, some embodiments analyze and segment the image into layers and objects to identify the quality based on the contextual usage. Some embodiments of the present invention are directed to identifying the amount of rescaling or other enhancement that should be performed to improve quality by leveraging a GAN model to take appropriate action by considering the reliability of content and availability of space in the document. Some embodiments of the present invention are directed to performing GAN-based enhancement operations on 3D embedded images and creating a 3D matrix for enhancing cells within the 3D image based on the purpose in the nearby text of the document.

Some embodiments of the present invention do more than automatic scaling of image objects being moved or copied to a target object location. Some embodiments of the present invention do more than determining an identity of at least one intended viewer of the visual media item. Some embodiments of the present invention do more than estimating a high-resolution version of visual data using a training dataset and reference dataset. Some embodiments of the present invention do more than highlighting displayed objects, through the use of color, based on context and an analysis. Some embodiments of the present invention do more than automatic scaling of text in images during resizing and/or expansion. Some embodiments of the present invention do more than use various configurations of neural networks to enhance images, including color enhancements, along with adjusting color maps. Some embodiments of the present invention do more than use generative adversarial networks to alter and enhance images.

Some embodiments of the present invention are directed to emphasizing relevant objects in an embedded image by identifying a context of the embedded image including a process including: determining a meaning of a set of text within a predefined region in which an image is added, the meaning determined by performing natural language processing on the set of text; identifying a set of features within the first image, the features being objects or text strings; analyzing the set of features with respect to the set of text to determine a relevance level of each feature to the document; ranking a first object as being more relevant than a second object, the first and second objects identified within the first image; and responsive to a first object being of a high relevance, modifying the first image to emphasize the first object.

Some embodiments of the present invention are directed to analyzing the context in which an image is used by considering usage purpose, textual content, image objects, and image qualities and determining an image enhancement scheme in which the context is emphasized. An example process includes: monitoring a document being accessed by a computing device; detecting an addition of a first image to the document; determining a meaning of a set of text within a predefined region in which the first image is added, the meaning determined by performing natural language processing on the set of text; identifying a set of features within the first image, the features being objects or text strings; analyzing the set of features with respect to the set of text to determine a relevance level of each feature to the document; ranking a first object as being more relevant than a second object, the first and second objects identified within the first image; and responsive to a first object being of high relevance, modifying the first image to emphasize the first object, the modifying including resizing the first object in the document and repositioning associated text in the first image.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/of" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
    identifying, in a document, an image placed at a location within the document and a set of text proximate the location of the image;
    determining, by natural language processing, a meaning of the set of text;
    determining a usage context for the image based on the meaning of the set of text, the usage context being a purpose for placing the image at the location within the document;
    identifying a set of features in the image;
    selecting, from the set of features, a sub-set of features as being related to the usage context; and
    determining an enhancement action that emphasizes the selected sub-set of features over remaining features in the set of features.

2. The computer-implemented method of claim 1, further comprising:
    monitoring the document during an editing process; and
    detecting placement of the image in the document,
    wherein:
    the determining the usage context is performed responsive to the detecting placement.

3. The computer-implemented method of claim 1, further comprising:
analyzing the set of features with respect to the meaning of the set of text to determine a relevance level of each feature to the meaning of the set of text; and
ranking a first feature as being more relevant than a second feature, the first and second features identified within the image;
wherein:
selecting the sub-set of features includes selecting the first feature, the first feature being related to the usage context by being more relevant than the second feature.

4. The computer-implemented method of claim 3, further comprising:
responsive to the first feature being of high relevance, modifying the image to emphasize the first feature, the modifying including resizing the first feature in the document and repositioning associated text in the image.

5. The computer-implemented method of claim 4, wherein the modifying further includes increasing resolution of the associated text in the image.

6. The computer-implemented method of claim 1, further comprising:
modifying the sub-set of features according to the enhancement action by:
inputting the image and the set of features into a generative adversarial network (GAN) to take the enhancement action.

7. The computer-implemented method of claim 1, further comprising:
identifying the image for placement into the document based on assigned topic from an image repository of general-purpose images; and
presenting the identified image to a user for use in the document.

8. A computer program product comprising a computer-readable storage medium having a set of instructions stored therein which, when executed by a processor, causes the processor to perform a method comprising:
identifying, in a document, an image embedded at a location within the document and a set of text proximate the location of the image;
determining, by natural language processing, a meaning of the set of text;
determining a usage context for the image based on the meaning of the set of text, the usage context being a purpose for placing the image at the location within the document;
identifying a set of features in the image;
selecting, from the set of features, a sub-set of features as being related to the usage context; and
determining an enhancement action that emphasizes the selected sub-set of features over remaining features in the set of features.

9. The computer program product of claim 8, further comprising:
monitoring the document during an editing process; and
detecting placement of the image in the document,
wherein:
the determining the usage context is performed responsive to the detecting placement.

10. The computer program product of claim 8, further comprising:
analyzing the set of features with respect to the meaning of the set of text to determine a relevance level of each feature to the meaning of the set of text; and
ranking a first feature as being more relevant than a second feature, the first and second features identified within the image;
wherein:
selecting the sub-set of features includes selecting the first feature, the first feature being related to the usage context by being more relevant than the second feature.

11. The computer program product of claim 10, further comprising:
responsive to the first feature being of high relevance, modifying the image to emphasize the first feature, the modifying including resizing the first feature in the document and repositioning associated text in the image.

12. The computer program product of claim 11, wherein the modifying further includes increasing resolution of the associated text in the image.

13. The computer program product of claim 8, further comprising:
modifying the sub-set of features according to the enhancement action by:
inputting the image and the set of features into a generative adversarial network (GAN) to take the enhancement action.

14. The computer program product of claim 8, further comprising:
identifying the image for placement into the document based on assigned topic from an image repository of general-purpose images; and
presenting the identified image to a user for use in the document.

15. A computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to perform a method comprising:
identifying, in a document, an image embedded at a location within the document and a set of text proximate the location of the image;
determining, by natural language processing, a meaning of the set of text;
determining a usage context for the image based on the meaning of the set of text, the usage context being a purpose for placing the image at the location within the document;
identifying a set of features in the image;
selecting, from the set of features, a sub-set of features as being related to the usage context; and
determining an enhancement action that emphasizes the selected sub-set of features over remaining features in the set of features.

16. The computer system of claim 15, further comprising:
monitoring the document during an editing process; and
detecting placement of the image in the document,
wherein:
the determining the usage context is performed responsive to the detecting placement.

17. The computer system of claim 15, further comprising:
analyzing the set of features with respect to the meaning of the set of text to determine a relevance level of each feature to the meaning of the set of text; and ranking a first feature as being more relevant than a second feature, the first and second features identified within the image;

wherein:

selecting the sub-set of features includes selecting the first feature, the first feature being related to the usage context by being more relevant than the second feature.

18. The computer system of claim 17, further comprising:

responsive to the first feature being of high relevance, modifying the image to emphasize the first feature, the modifying including resizing the first feature in the document, repositioning associated text in the image, and increasing resolution of the associated text in the image.

19. The computer system of claim 15, further comprising:

modifying the sub-set of features according to the enhancement action by:

inputting the image and the set of features into a generative adversarial network (GAN) to take the enhancement action.

20. The computer system of claim 15, further comprising:

identifying the image for placement into the document based on assigned topic from an image repository of general-purpose images; and presenting the identified image to a user for use in the document.

\* \* \* \* \*